United States Patent
Rozenfeld et al.

(10) Patent No.: US 8,237,998 B2
(45) Date of Patent: Aug. 7, 2012

(54) FLEXIBLE SYSTEM FOR FEEDING AND PROCESSING MULTI-PAGE DOCUMENTS

(75) Inventors: Boris Rozenfeld, New Milford, CT (US); Douglas B. Quine, Bethel, CT (US); Richard W. Heiden, Shelton, CT (US); Arthur H. DePoi, Brookfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 760 days.

(21) Appl. No.: 12/212,770

(22) Filed: Sep. 18, 2008

(65) Prior Publication Data

US 2010/0067071 A1    Mar. 18, 2010

(51) Int. Cl.
*H04N 1/04* (2006.01)

(52) U.S. Cl. ........ 358/498; 399/367; 399/368; 399/369; 399/370; 399/371

(58) Field of Classification Search .................. None
See application file for complete search history.

(56) References Cited

U.S. PATENT DOCUMENTS

| | | |
|---|---|---|
| 4,663,873 A | 5/1987 | Shinbrot |
| 4,673,286 A * | 6/1987 | Shinbrot ............... 355/25 |
| 4,693,594 A | 9/1987 | Garavuso et al. |
| 5,087,027 A | 2/1992 | Acquaviva |
| 6,374,061 B1 | 4/2002 | Williams |
| 6,611,362 B2 | 8/2003 | Mandel et al. |
| 6,762,356 B2 | 7/2004 | McNab et al. |
| 6,830,453 B2 | 12/2004 | Jung |
| 7,815,052 B2 * | 10/2010 | Tonami .................. 209/11 |
| 2007/0091371 A1 * | 4/2007 | Sugihara .............. 358/1.18 |

* cited by examiner

*Primary Examiner* — Marivelisse Santiago Cordero
*Assistant Examiner* — John Wallace
(74) *Attorney, Agent, or Firm* — George M. Macdonald; Charles R. Malandra, Jr.; Steven J. Shapiro

(57) ABSTRACT

A system for processing documents having fastening devices includes a document transport system and a fastening device detecting station connected to the transport system that is adapted to detect a fastening device securing together pages of a document. The fastening device removing station is adapted to remove a fastening device securing together pages of a document. A scanning station is adapted to scan the pages of a document. A page flipping station is adapted to flip and position pages of a document to be scanned. A systems controller controls the transport system and the stations based on information provided by the fastening device detecting station for a document to be scanned, to cause such document to be processed by the fastening device removing before scanning of the document or by the page flipping station during scanning of the document to be scanned.

13 Claims, 6 Drawing Sheets

FLEXIBLE SYSTEM FOR FEEDING AND PROCESSING MULTI-PAGE DOCUMENTS

FIELD OF THE INVENTION

The invention disclosed herein relates generally to a flexible system for feeding and processing multi-page documents and, more particularly, to a system that feeds, processes single and multi-page documents that may have the pages fastened together and may have duplexed information on two one or more sheets comprising the document.

BACKGROUND OF THE INVENTION

Documents vary in how they are organized. A document can be a single or a multi-page document. The document can have some or all of the document pages duplexed, that is, have information printed on both sides of a page. Additionally, a document may have the document pages secured together. The fastening device can be a staple, a clip such as a paper clip, a binder clamp or other forms of fastening. As a result, it is difficult to automate the processing of documents, particularly multi-page documents. Additionally, a document may have information obscured by the fastening means. For example, printed information can be under a staple or clip. When copying or scanning documents, a user must prepare the pages, often by removing any staples or other fasteners, and thereafter manually or automatically process the document such as by scanning, or copying, etc. each document page.

Typically, to automate coping or scanning of multi-page documents using existing technology, any page fastening device (staple, paper clip, clamp, etc.) must be manually removed from document. Then, the document can be placed in a feeder, which will separate sheets from the stack of pages and feed the pages for processing. Very often sheets of the document can be damaged due to staple removing causing a feeder to jam. Although many separate document processing modules have been developed to individually provide document processing functions such as staple removing, page flipping for books and document handler staple detector means, a comprehensive system is desirable for the processing of various types of multi-page documents.

It is an object of the present invention to facilitate the automated processing of documents.

It is a further object to provide a system that can automatically accommodate and process various types of document organizations.

It is yet another object of the present invention to provide a flexible system for detecting whether the pages of a multi-page document are held together by a fastener and depending on the determination automatically processing such documents.

It is still another object of the present invention to determine if any information on a document is located on the document page with respect to a fastener such that the document page cannot be properly processed without loss of such information.

SUMMARY OF THE INVENTION

The present invention provides a flexible system for feeding and processing multi-page documents where fasteners are detected and, if need be, removed to facilitate further processing. Where removal of the fastener is not needed, further processing can involve the flipping of fastened document pages.

A system for feeding and processing documents embodying the present invention includes a document transport system adapted to transport documents to document processing stations. A fastening device detecting station is connected to the transport system and is adapted to detect a fastening device securing together pages of a document. A fastening device removing station is connected to the transport system. The fastening device removing station is adapted to remove a fastening device securing together pages of a document. A scanning station is connected to the transport system. The scanning station is adapted to scan the pages of a document. A page flipping station is connected to the transport system. The page flipping station is adapted to flip pages of a document having a fastening device securing together pages of a document such that each document pages is positioned to be scanned at the scanning station. A systems controller is interactively connected to and controls the operation of the document transport system, the fastening device detecting station, the fastening device removing station, the scanning station and the page flipping station. The systems controller controls the operation of the transport system and the stations based on information provided to the systems controller by the fastening device detecting station for a document to be scanned at the scanning station, causes such document to be scanned to be processed by the fastening device removing station to remove a fastening device securing together pages of a document before scanning of the document or by the page flipping station during scanning of the document to be scanned.

A method for feeding and processing documents embodying the present invention includes the steps of feeding a document onto a transport system adapted to move the document to a plurality of processing stations and determining if the document pages are secured together by a fastener. The nature of any fastener securing the document pages together is determined and whether any information is positioned on a document page in a location on the page with respect to any fastener such that such location would preclude subsequent proper processing of the information is also determined. The document is aligned to move the document into a proper position for subsequent processing. The document is routed along a first path of travel when information is positioned on a document page in a location on the page with respect to any fastener such that such location would preclude subsequent proper processing of the information. The first routing path of travel includes the steps of removing the fastener from the document and feeding the unfastened document pages seriatim for processing the unfastened document pages. The document is routed along a second path of travel when no information is positioned on a document page in a location on the page with respect to any fastener such that such location would preclude subsequent proper processing of the information. The second routing path of travel includes the steps of turning the document pages and processing turned document pages.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PRESENT INVENTION

Figure 1:
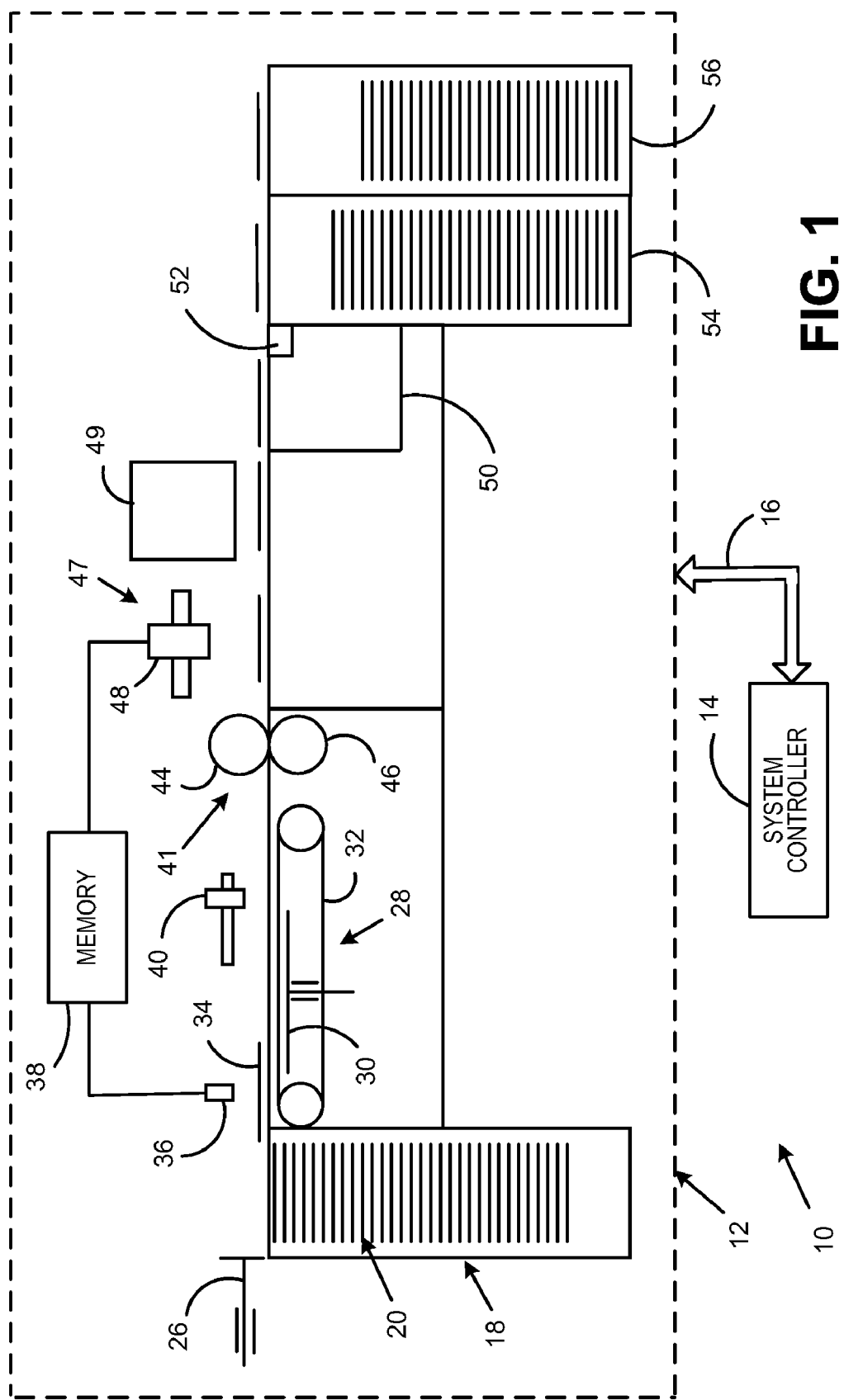
FIG. 1 is a block diagram of a flexible system for feeding and processing multi-page documents embodying the present invention.

Reference is now made to FIG. 1. A flexible smart feeder system for feeding and processing multi-page documents is shown generally at 10 includes a series of modules 12 controlled by a systems controller 14. The system controller 14 is interactively connected to the modules 12 by bi-directional communications bus 16. This allows information to be communicated from the systems controller 14 to the modules (sections) 12 and from the modules (sections) 12 to the systems controller.

Figure 2:
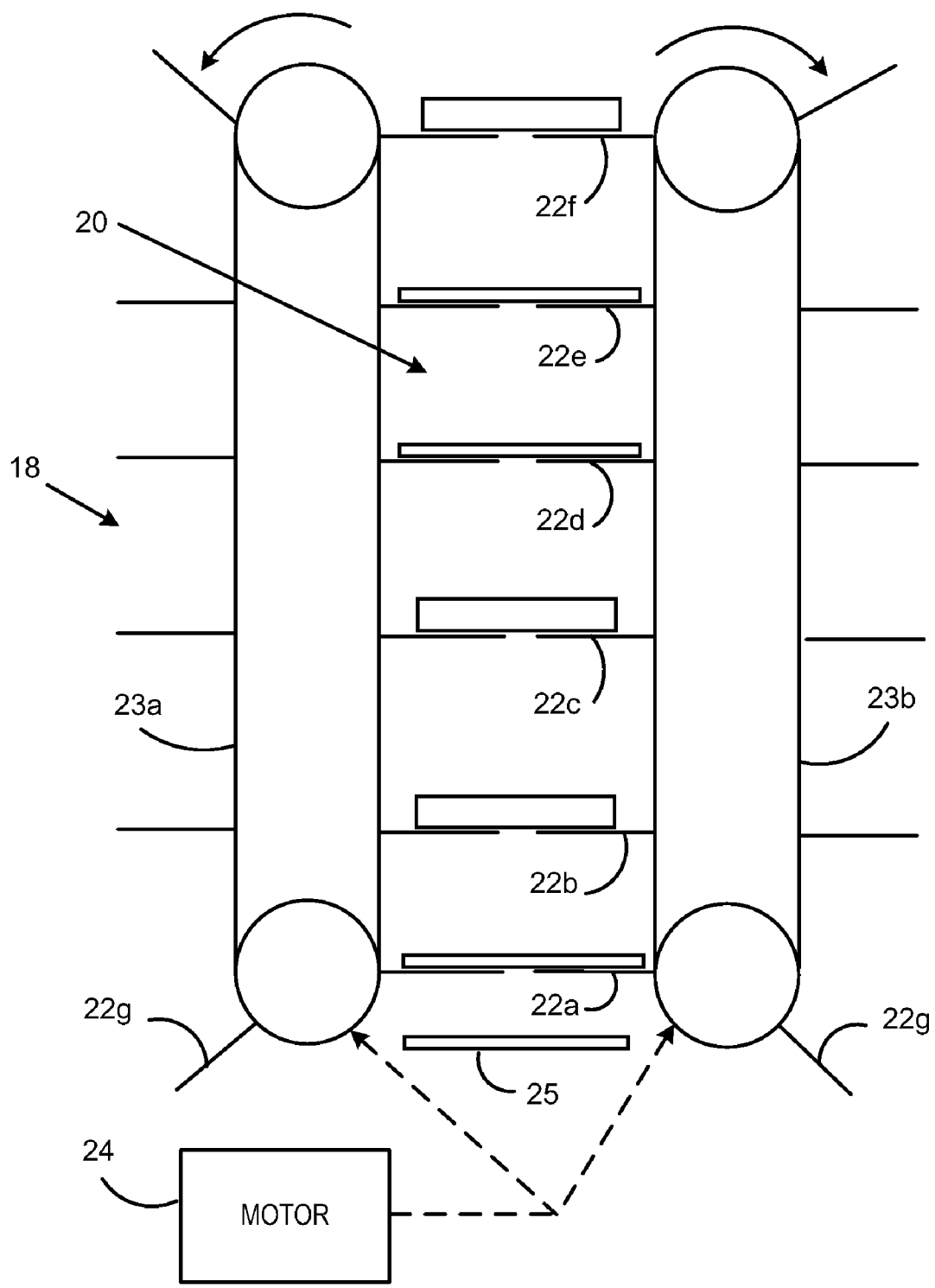
FIG. 2 is a diagrammatic illustration of aspects of the document hopper module shown in FIG. 1.

The system includes an original document hopper 18 for supporting a stack of single and/or multi-page documents shown generally at 20. The stack of documents rests on a series of moveable shelves 22a-g shown in FIG. 2. Each document shelf has two shelf segments. The series of shelves 22a-g are is adapted to be moved in an upward direction when driven by a shelf motor 24. Each of the series of shelves segments are attached to a moveable belt, either belt 23a or belt 23b. The moveable shelves 22a-g form a document hopper elevator. Documents can be loaded into the hopper at the bottom of the hopper. The documents can be loaded into the hopper by a mechanism, not as shown, so that documents, such as document 25 being engaged by shelf 22g segments, can engage shelf segments as the belt 23a and 23b are driven to move the shelves 22. As documents in the hopper 18 come to the top of the hopper, a document feeder pusher 26 shown in FIG. 1 pushes documents onto a transport system shown generally as 28.

The transport system 28 consists of various transport belts which transport the document and provide space in the middle of the transport for a document turntable 30. The transport belts such as belt 32 can be on one side of the turntable 30 and another belt, not shown, can be on the other side of turntable 30. Documents can be transported by the transport system 28 to the various modules (sections) for processing and, when necessary, the turntable 30 can move in an upward direction to lift an original document and turn the document to position the document and align it in a desired position for further processing by down stream modules.

A document such as document 34 is moved by the transport system 28 to be imaged by a camera 36. Depending on the nature of the camera, either the entire document may be imaged or just certain portions of the document. The image from the camera is connected to a memory 38 for processing by the systems controller 14. The processing determines the nature of the images of each document such as document 34. The image is employed to detect the presence of any staples, clips or other forms of fastening or binding of the document pages and, importantly, to determine if there is any printed material adjacent to or under the fastener which would prevent a down stream scanner 40 from fully scanning the document. The first page of the multi-page document can be used as an indicator whether the printing is so far removed, position wise, from the fastener that the scanning process can be implemented without removing the fastener and still fully scan all the information on the document page.

The flexible system for feeding and processing multi-page documents can be equipped with various types of fastening method recognition sensor(s), which could be based, for example, on a video camera which stores images of the staple, paper clip, clamp and other forms of binding or fastening in the memory. When document gets exposed to the camera 36, the control module 14 analyzes the captured image, comparing the captured image to images stored in the memory to thereby determine how the imaged document is fasten. The controller 14 then processes the data to determine how further processing of the imaged document will proceed. A decision is made whether to remove, for example, any paper clip or clamp, etc. and send a document to a conventional feeder, where the document pages or sheets will be separated and moved seriatim to the scanning position, or to move the document to the page flipping device 49 where the document is secured by a fastener. The controller, thus, based on information from the fastening device detecting module (station) determines the routing of the document path of travel, that is, whether the document will be routed to a fastener removal station or to a page flipping station.

Where the document, such as document 34 is imaged on only an edge, the document is transported further by the document transport system 28 to be positioned above the turntable 30 which is operated to move the document into the proper alignment for further edge imaging. The transport 28 can then move the document back under the camera 36 for further imaging. Once the edges of a document are fully imaged either by a single image or by multiple images, a determination is made for further processing. Alternatively, the fastener detector can be a device that detects the presence of metal such as a metal staple or clip. In such case the detector can be a based on an inductive type proximity switch sensitive enough to be triggered by a metal staple, clip or other metal fastener.

Where a staple, clip or other fastener obscures printed material that needs to be scanned or is located in a position such that processing of the multi-page document may be compromised, the document 34 is moved to a fastener removing device 40 where the staple, clip or other fastener is removed. The document is then moved by further sheet feeding apparatus 41 here shown diagrammatically as a series of sheet feeding rollers 44 and 46, under the scanning station 47. At the scanning station 47 the scanner 48 scans the document and if any document or fastener has not been removed a page flipping device 49 flips the pages for scanning. Where the document is a two sided document, the scanning station 47 may be such that each side of the page can be scanned by two scanners or by physically moving the document pages so that each page side is under the scanner or by moving the scanner to scan each side of the document page sides.

After the single page document has been scanned, where a fastener has been removed or a fastened multi-page document is fully scanned by flipping the document pages, a determination is made whether the scanned image is to be stored in the memory 38 or to be stored in the memory 38 and used to print a copy of the scanned document by printer 50. Where a printed copy is made of the scanned document by printer 50, the printer prints the documents which then may be fastened if desired by a fastening device 52 such as a stapler and moved into a stack of printed materials in a printed materials hopper 54. The original document, that is, the document from hopper 18, is moved, and fastened if desired, into the stack of original documents in hopper 56.

Where the original document has not been predetermined as being single or double sided, the scanning device 47 can be made to scan both sides of each page of a multi-page document and the system controller 14 will process the scanned image to determine the content of each page side. Where nothing exists on one side of a page, the lack of printed material on the page side of the sheet is filtered by the systems controller 14 to determine that the page is single sided. This accommodates situations where a multi-page document has some but not all of the pages with printing on both sides of the sheet. This information as to which pages of a multi-page document, if any, are duplexed with information on two sides of a sheet and which page are single sided enhance the downstream processing by enabling selective processing of each page depending on whether such document page is a duplexed page or is single sided page.

Figure 3A:
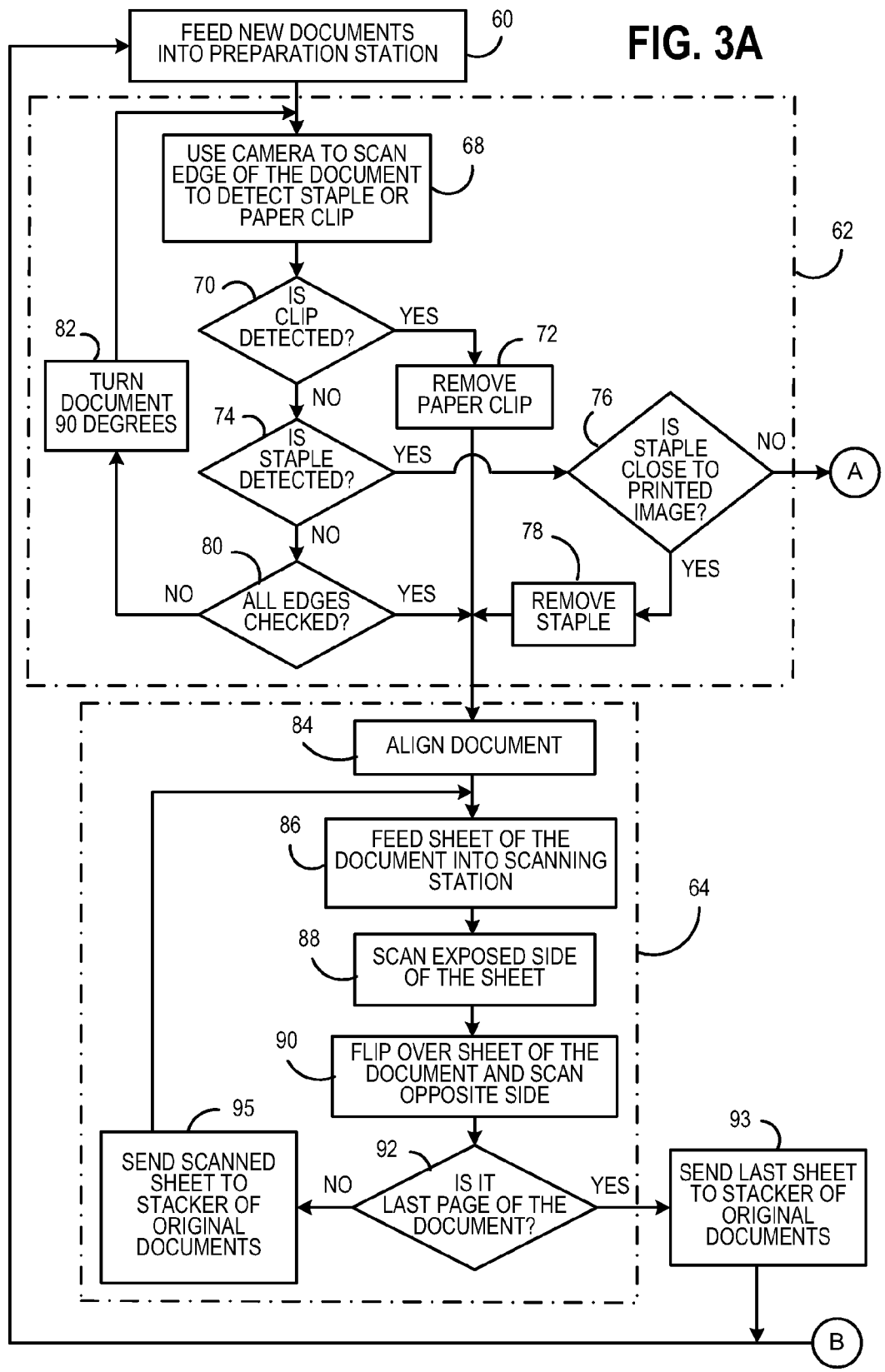
FIG. 3 is a flow chart of the operation of the flexible system for feeding and processing multi-page documents shown in FIG. 1.
Figure 3B:
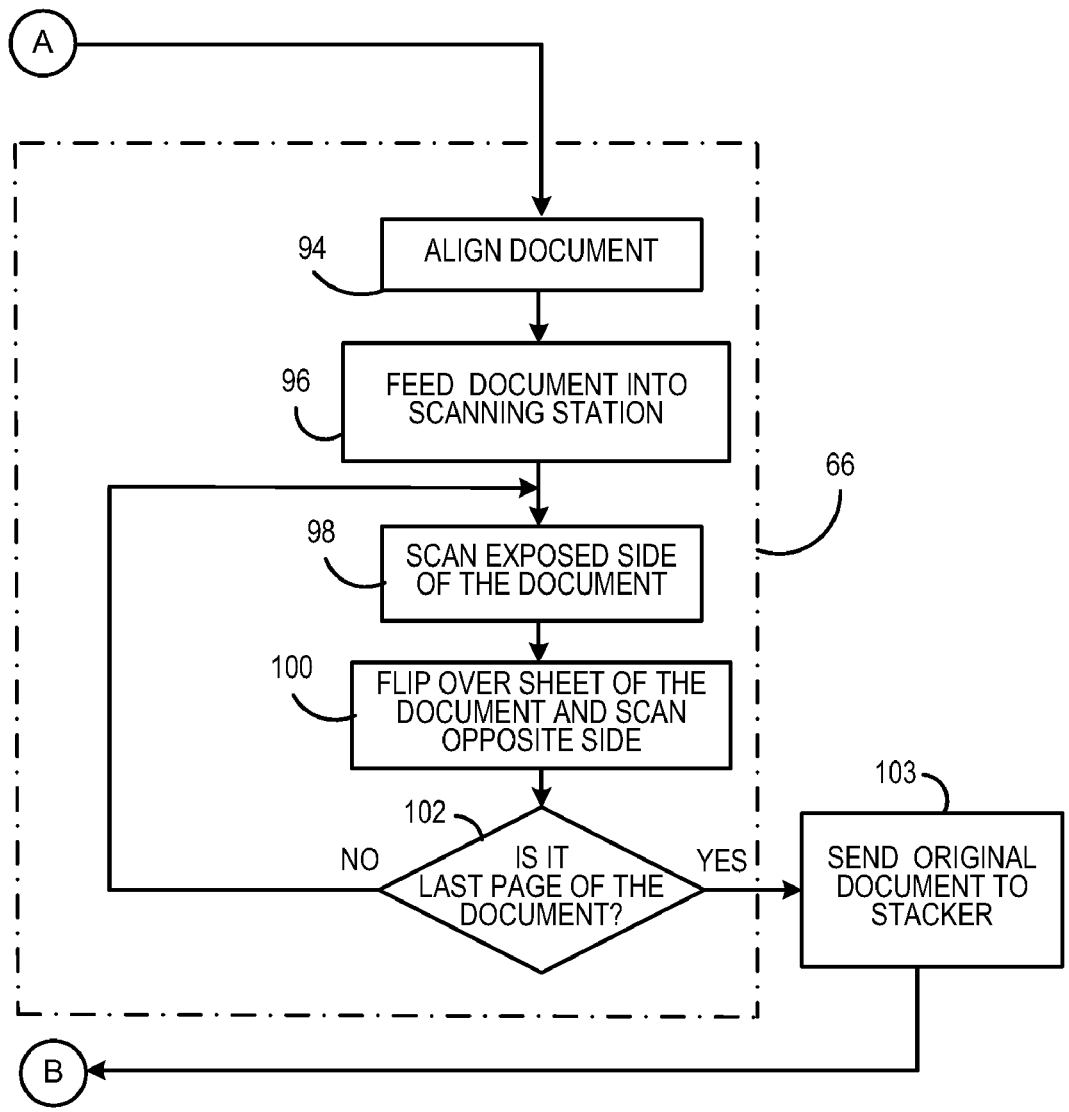

References made to FIG. 3. The process begins at block 60 where a new document is fed into the preparation station. The document is processed according to the flow chart in three generally separate software modules. A first software module 62 determines the nature of the document. Is the document, for example a stack of loose sheets, fastened sheets, or sheets fastened in a way that printed material is obscured by the fastener and cannot be properly scanned and the nature of the fastener. While the nature of the fastener is shown in the flow chart as being staples and clips, there are various forms of fastening such as books which are bound by edge binding, sheets that are held together by a spiral plastic edge binding and the like. Each of these types of bindings can also be detected, if desired, and thereafter processed appropriately, similar to the clips and staples. The second and third module includes a software module 64 for scanning loose sheets of paper and a software module 66 for scanning fastened sheets of pages.

Returning to the software module 62, after a document is fed into the preparation station, a camera is used at block 68 to scan the edges of the document to detect a staple, clip or other fastening means if the system is so arranged. A determination is then made at decision block 70 if a clip is detected, where a clip is detected, the clip is removed at block 72 and the process continues in software module 64. Where a clip is not detected at block 70, the process continues to decision block 74 where determination is made if a staple is detected.

Where at decision block 74 a staple is detected, the process continues to decision block 76 where a determination is made if the staple is close to printed material to be scanned. If this is the case the staple is removed at block 78 and the process continues to software module 64, where this is not the case the process continues at software module 66. If a staple is not detected at decision block 74, a determination is made at decision block 80 if all the edges of the document have been checked. Where this is the case the process continues at software module 64, however, where this is not the case, at block 82 the document is turned 90 degrees and the process loops back to block 68.

Turning now to software module 64 the document is aligned at block 84 and the sheet of document is fed into the scanning station at block 86. The exposed side of the sheet is scanned at block 88 and at block 90 the sheet is flipped over and the opposite side of the document page is scanned. A determination is then made at decision block 92 if this is the last page of the document. Where this is the last page of the document, at block 93 the last sheet of the original document is sent to the original document stacker and the process loops back to block 60. Where at decision block 92 this is not the last page of the document, at block 95 the scanned sheet is sent to the stacker of original documents and then the process loops back to block 86.

Referring now to software module 66, at block 94 the document is aligned and at block 96 the document is fed into the scanning station. At block 98 the exposed side of the document page is scanned and at block 100 the sheet of the document page is flipped over and the opposite side of the document page is scanned. At the decision block 102 a determination is made if this is the last page of the document. When this is the case at block 103 the original document is sent to the original document stacker and the process loops back to block 60. Where this is not the case the system loops back to block 98. The operation, depending on the nature of the particular document, routes the document to one of two paths for processing as reflected by software module 64 and by software module 66.

Figure 4:
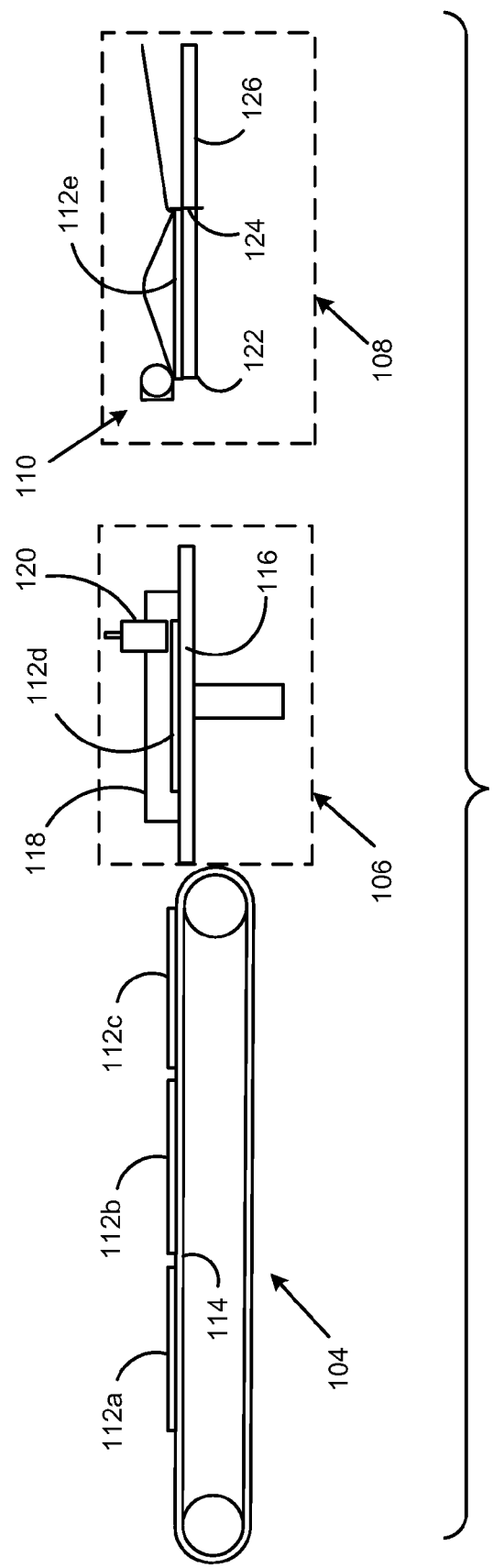
FIG. 4 is a block diagram of an alternative embodiment of the flexible system for feeding and processing multi-page documents which also embodies the present invention; and, FIG. 5 is a block diagram top view of the flexible system for feeding and processing multi-page documents shown in FIG. 4.
Figure 5:
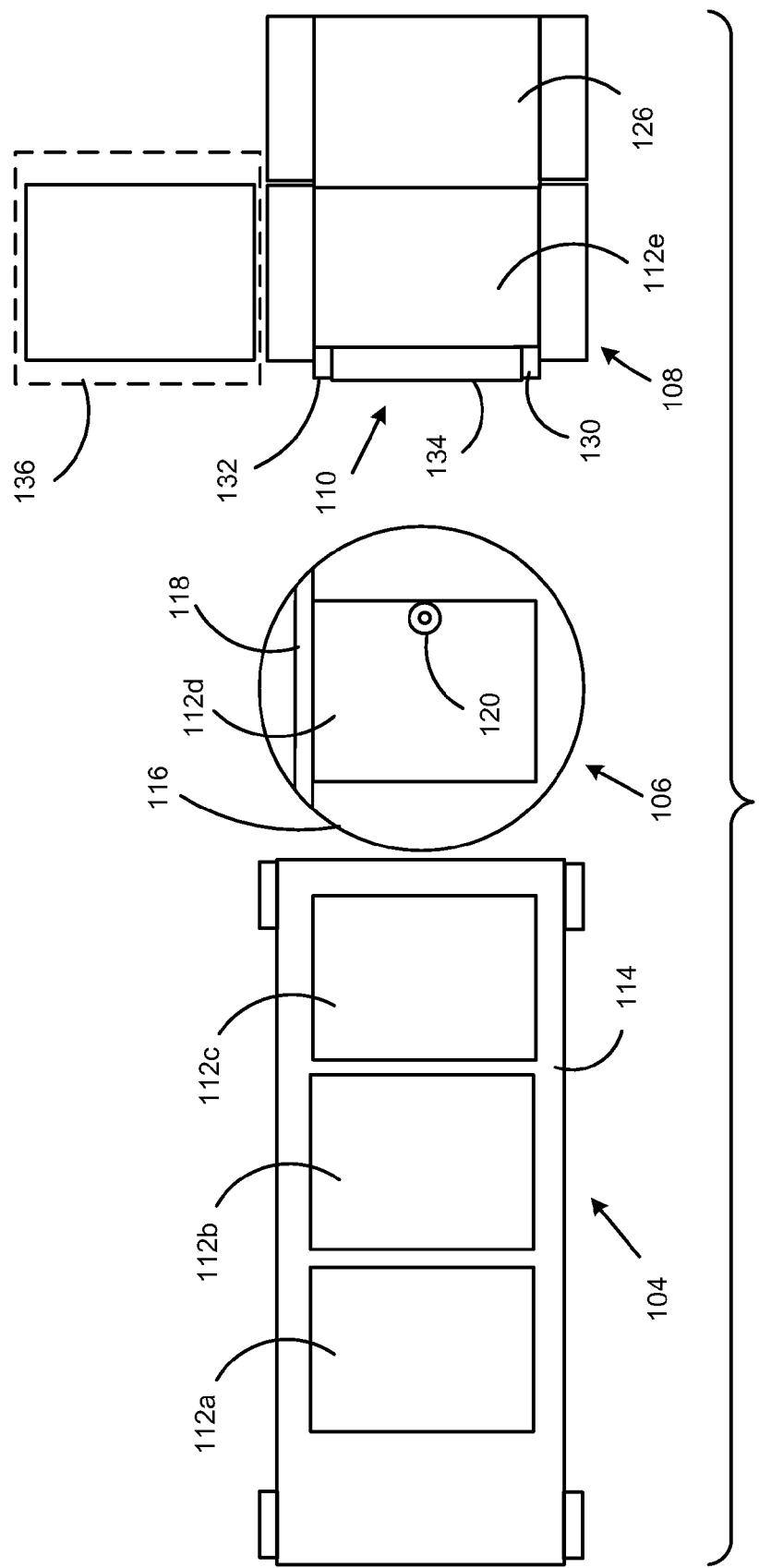

Various different modules from those shown in FIG. 1 can be employed such as shown in FIGS. 4 and 5. Referring now to FIGS. 4 and 5, the modules included an input conveyor shown generally at 104, an orientation section shown generally at 106, page flipping section shown generally at 108 and scanning section shown generally at 110. Documents 112a, 112b and 112c are placed on conveyer belt 114 of the input conveyor 104. Every feed cycle input conveyor 104 moves a document onto surface of the document orientation section 106, which consists of turntable 116, aligner 118 and staple detecting sensor 120. Upon arrival at the orientation station 106, a document gets aligned against the aligner 118, a vertical surface mounted on the top of the turn table. Then the sensor 120 moves around edges of a document such as document 112d and locates any staple or other type of fastener for which the system is configured. Sensor 120 can be based on inductive type proximity switch sensitive enough to be triggered by the metal staple.

After a staple location is detected, the turn table 116 positions document in a way that when it is moved to the next section the stapled side of the document is the leading side of the document. Then the document such as document 112e moves to the scanning section 110 where it gets acquired by the vacuum table 122 and stapled side of the document gets clamped by the clamp 124 to keep it flat during scanning. Vacuum table 126 can move back and forth moving document in and out of scanning zone. A page flipping device consists of two narrow vacuum drums 130 and 132 which are positioned close to the edges of the document. The drums spin in the direction opposite to the direction of the table motion, so that when table moves towards the drums they acquire the top page pulling it in the opposite to the motion direction. As soon as page below is exposed, the scanner 134, positioned in between vacuum drums, starts acquiring image from this page. After scanning of the current page is finished the vacuum table 126 retracts to initial position, to start processing of the following page.

After the last page of the document such as document 112e is scanned, the document gets ejected into the section 136 shown in FIG. 5 where the document will be flipped upside-down and then returned back to the vacuum table 126 for the back side scanning. Then control module 14 shown in FIG. 1 will process data acquired from, for example, the odd (top side) and even pages (back side) of the document to organize document page data to be in the correct sequence for further storing and printing. If two consecutive even pages of the document are detected empty (most of the time it means that document is printed on one side only) the control module will abort scanning and move the document for the output delivery.

The system shown in FIGS. 4 and 5 can be modified to employ two scanners. In such case a first scanner scans one side of a page and a second scanner scans the other side of the pervious page when vacuum table retracts. This avoids the ejection into the section 136 shown in FIG. 5 where a document is flipped upside-down and to then be returned back to the vacuum table.

While the present invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A system for feeding and processing documents comprising:
    a document transport system adapted to transport documents to document processing stations;
    a fastening device detecting station connected to said transport system and adapted to detect a fastening device securing together pages of a document;
    a fastening device removing station connected to said transport system, said fastening device removing station adapted to remove a fastening device securing together pages of a document;
    a scanning station connected to said transport system, said scanning station adapted to scan the pages of a document;
    a page flipping station connected to said transport system, said page flipping station adapted to flip pages of a document having a fastening device securing together pages of a document such that each document page is positioned to be scanned at said scanning station; and
    a systems controller interactively connected to and controlling the operation of said document transport system, said fastening device detecting station, said fastening device removing station, said scanning station and said page flipping station, said systems controller controlling the operation of said transport system and said stations based on information provided to said systems controller by said fastening device detecting station for a document to be scanned at said scanning station, to cause such document to be scanned to be processed by only one of said fastening device removing station to remove a fastening device securing together pages of a document before scanning of said document and said page flipping station during scanning of said document to be scanned, based upon a determined type of fastening device determined by the fastening device detecting station.

2. A system for feeding and processing documents as defined in claim 1 wherein said document includes edges and said fastening device detecting station includes a device adapted to inspect the edges of a document for any fastening device securing together pages of a document.

3. A system for feeding and processing documents as defined in claim 2 wherein said fastening device detecting station device is a camera which images the edges of a document and wherein images of fastening devices are prestored for use by said system controller in analyzing images of the edges of a document to determine the presence of a fastener.

4. A system for feeding and processing documents as defined in claim 3 wherein said system controller in analyzing images of the edges of a document to determine the presence of a fastener further analyzes said image to determine if any information on a document page is positioned with respect to a fastener such as to prevent the scanning of all the information on said document page.

5. A system for feeding and processing documents as defined in claim 3 wherein said system controller in analyzing images of the edges of a document to determine the presence of a fastener further analyzes said image to determine if any information on a document page is positioned with respect to a fastener such as to prevent the scanning of all the information on said document page and wherein said systems controller controls the operation of said transport system and said stations, to cause a document to be scanned to be processed by said fastening device removing station to remove a fastening device securing together pages of a document before scanning of said document when information on a document page is positioned with respect to a fastener such as to prevent the scanning of all the information on said document page and instead to cause a document to be scanned to be processed by said page flipping station during scanning of said document when information on a document page is positioned with respect to a fastener such as not to prevent the scanning of all the information on said document page.

6. A system for feeding and processing documents as defined in claim 2 wherein said fastening device detecting station device is a metal detecting device which is sensitive to the presence of metal.

7. A system for feeding and processing documents as defined in claim 2 further including a moveable turntable positioned adjacent said transport system and connected to said systems controller, said turntable adapted to be controlled to operate by said systems controller to engage and turn a document to be processed such that the document is in proper orientation for the processing to be performed.

8. A system for feeding and processing documents as defined in claim 7 further including a document feeder connected to said transport system, said document feeder having a document hopper for documents to be processed and adapted to feed documents to be processed from said hopper onto said transport system.

9. A system for feeding and processing documents as defined in claim 8 further including a document stacker connected to said transport system, said document stacker adapted to stack processed documents.

10. A system for feeding and processing documents as defined in claim 7 wherein said movable turntable is controlled by said systems controller to position a document having a fastening device securing together document pages in a proper orientation for said fastening device removing station to remove the document fastening device.

11. A method for feeding and processing documents in a system including a systems controller and a transport system, comprising the steps of:
    feeding a document onto the transport system adapted to move the document to a plurality of processing stations;
    determining, using the systems controller, if the document pages are secured together by a fastener;
    determining, using the systems controller, information regarding any fastener securing the document pages together;
    determining, using the systems controller, whether any information is positioned on a document page in a location on said page with respect to any fastener such that such location would preclude subsequent proper processing of said information;

aligning said document to move said document into a proper position for subsequent processing;

routing said document along a first path of travel when information is positioned on a document page in a location on said page with respect to any fastener such that such location would preclude subsequent proper processing of said information, said first routing path of travel including the steps of removing the fastener from said document and feeding the unfastened document pages seriatim and processing said unfastened document pages; and, instead of routing said document along the first path of travel, routing said document along a second path of travel, different from the first path of travel, when no information is positioned on a document page in a location on said page with respect to any fastener such that such location would preclude subsequent proper processing of said information, said second routing path of travel including the steps of turning said document pages and processing turned document pages.

12. A method for feeding and processing documents as defined in claim 11 wherein said processing of said unfastened seriatim fed document pages includes scanning of said pages and wherein said processing of said turned document pages is the scanning of said turned pages.

13. A method for feeding and processing documents as defined in claim 11 wherein said aligning said document to move said document into a proper position for subsequent processing includes the step of rotating said document such that for said first route of travel said document is properly oriented for removing the fastener from said document and feeding the unfastened document pages seriatim and processing said unfastened document pages and for said second route of travel said document is properly oriented for turning said document pages and processing turned document pages.

* * * * *